(12) United States Patent
Tsuruta et al.

(10) Patent No.: US 11,649,808 B2
(45) Date of Patent: May 16, 2023

(54) MULTI-STABLE ACTUATOR

(71) Applicant: Toyota Motor Engineering & Manufacturing North America, Inc., Plano, TX (US)

(72) Inventors: Ryohei Tsuruta, Ann Arbor, MI (US); Umesh N. Gandhi, Farmington Hills, MI (US); Shardul Singh Panwar, Ann Arbor, MI (US); Paul A. Gilmore, Ann Arbor, MI (US); Brian J. Pinkelman, Ann Arbor, MI (US); Mark A. Gummin, Silverton, OR (US); Brian J. Stasey, Fishers, IN (US)

(73) Assignees: Toyota Motor Engineering & Manufacturing North America, Inc., Plano, TX (US); MIGA Technologies, LLC, Silverton, OR (US)

( * ) Notice: Subject to any disclaimer, the term of this patent is extended or adjusted under 35 U.S.C. 154(b) by 0 days.

(21) Appl. No.: 17/505,912

(22) Filed: Oct. 20, 2021

(65) Prior Publication Data
US 2023/0124526 A1 Apr. 20, 2023

(51) Int. Cl.
*F03G 7/06* (2006.01)
(52) U.S. Cl.
CPC .................. *F03G 7/06143* (2021.08)
(58) Field of Classification Search
None
See application file for complete search history.

(56) References Cited

U.S. PATENT DOCUMENTS

| | | | |
|---|---|---|---|
| 8,741,076 B2* | 6/2014 | Gao | F03G 7/065 60/527 |
| 8,853,916 B2* | 10/2014 | Browne | H01L 41/04 310/332 |
| 9,512,829 B2 | 12/2016 | Stefano et al. | |
| 9,588,020 B2* | 3/2017 | Browne | F03G 7/065 |
| 2008/0271559 A1 | 11/2008 | Garscha et al. | |
| 2008/0307786 A1 | 12/2008 | Hafez et al. | |
| 2012/0239183 A1* | 9/2012 | Mankame | F03G 7/065 700/213 |
| 2020/0010001 A1* | 1/2020 | Pinkelman | B60N 2/54 |
| 2020/0309102 A1* | 10/2020 | Henderson | F03G 7/06 |
| 2020/0378370 A1* | 12/2020 | Köpfer | F03G 7/065 |

FOREIGN PATENT DOCUMENTS

| | | | |
|---|---|---|---|
| DE | 102019204866 A1 | 10/2020 | |
| WO | WO-2019097437 A1 * | 5/2019 | .......... F03G 7/065 |
| WO | 2020183360 A1 | 9/2020 | |

\* cited by examiner

*Primary Examiner* — Shafiq Mian
(74) *Attorney, Agent, or Firm* — Christopher G. Darrow; Darrow Mustafa PC (57) ABSTRACT

A multi-stable actuator includes a first superelastic-shape memory alloy (SE-SMA) wire extending between a first fixed support and a movable element and a second SE-SMA wire extending between a second fixed support and the movable element. The first SE-SMA wire is in tension against the second SE-SMA wire and the second SE-SMA wire is in tension against the first SE-SMA wire. The multi-stable actuator also includes at least one heating device configured to heat the first SE-SMA wire independent of the second SE-SMA wire and to heat the second SE-SMA wire independent of the first SE-SMA wire such that the movable element moves between and to at least three fixed positions without use of a brake or clutch.

20 Claims, 6 Drawing Sheets

MULTI-STABLE ACTUATOR

TECHNICAL FIELD

The present disclosure relates generally to actuators and, more particularly, to multi-stable actuators.

BACKGROUND

An actuator is a device that receives a control signal and, in response thereto, moves or controls a component or system of a machine. Stated differently, an actuator is a device through which a control system moves a component (e.g., a switch or a valve) of a machine. In addition, a linear actuator is an actuator that creates motion in a straight line.

Shape memory alloys are alloys that can be deformed from an initial shape into a desired and, what would appear to be, final shape at one temperature (e.g., room temperature) and then return to its initial shape without use of an external mechanical force when heated to another temperature (e.g., 100° C.). With such properties, shape memory alloys are used for components such as medical stents, dental wires, eyeglass frames, and fire security and protection systems, among others. Shape memory alloys can also be used in actuators to provide movement of a switch or movable element. However, such actuators are "monostable", i.e., have only one position at a given temperature (e.g., room temperature) unless a brake or clutch is included to provide more than two actuation positions.

The present disclosure addresses issues related to actuators that use shape memory alloys, and other issues related to actuators and shape memory alloys.

SUMMARY

This section provides a general summary of the disclosure, and is not a comprehensive disclosure of its full scope or all of its features.

In one form of the present disclosure, a multi-stable actuator includes a first superelastic-shape memory alloy (SE-SMA) wire extending between a first fixed support and a movable element and a second SE-SMA wire extending between a second fixed support and the movable element. The first SE-SMA wire is in tension against the second SE-SMA wire and the second SE-SMA wire is in tension against the first SE-SMA wire. The multi-stable actuator also includes at least one heating device configured to heat the first SE-SMA wire independent of the second SE-SMA wire and to heat the second SE-SMA wire independent of the first SE-SMA wire such that the movable element moves between and to at least three fixed positions without use of a brake or clutch.

In another form of the present disclosure, a multi-stable actuator includes a first superelastic-shape memory alloy (SE-SMA) wire extending between a first fixed support and an electrical ground configured as a movable element, a second SE-SMA wire extending between a second fixed support and the movable element, wherein the first SE-SMA wire is in tension against the second SE-SMA wire and the second SE-SMA wire is in tension against the first SE-SMA wire, and an electrical power supply. The electrical power supply is configured to apply electrical current to and heat the first SE-SMA wire independent of the second SE-SMA wire such that the first SE-SMA wire decreases in length a first predetermined amount and the second SE-SMA wire increases in length the first predetermined amount such that the movable element moves from a first predetermined fixed position to a second predetermined fixed position. The electrical power supply is also configured to apply electrical current to and heat the second SE-SMA wire independent of the first SE-SMA wire such that the second SE-SMA wire decreases in length a second predetermined amount and the first SE-SMA wire increases in length the second predetermined amount such that the movable element moves from the second predetermined fixed position to a third predetermined fixed position different than the first and second predetermined fixed positions.

In still another form of the present disclosure, a method of operating an actuator includes the steps of: a) selectively heating a first superelastic-shape memory alloy (SE-SMA) wire of a multi-stable actuator such that the first SE-SMA wire decreases in length and a second SE-SMA wire of the multi-stable actuator increases in length; b) selectively heating the second SE-SMA wire such that the second SE-SMA wire decreases in length and the first SE-SMA wire increases in length; and c) repeating a) and b) such that the movable element moves between and is stationary at more than two fixed positions without use of a brake. The multi-stable actuator includes the first SE-SMA wire extending between a first fixed support and a movable element, the second SE-SMA wire extending between a second fixed support and the movable element, and the first SE-SMA wire in tension against the second SE-SMA wire and the second SE-SMA wire is in tension against the first SE-SMA wire.

Further areas of applicability and various methods of enhancing the above technology will become apparent from the description provided herein. The description and specific examples in this summary are intended for purposes of illustration only and are not intended to limit the scope of the present disclosure.

BRIEF DESCRIPTION OF THE DRAWINGS

The present teachings will become more fully understood from the detailed description and the accompanying drawings, wherein.

DETAILED DESCRIPTION

The present disclosure provides a lightweight multi-stable actuator that has three or more predefined fixed actuator positions. As used herein, the phrase "multi-stable actuator" refers to an actuator with more than two fixed actuator positions and the phrases "fixed actuator position" and "fixed position" refers to a stationary position of a movable element of a multi-stable actuator that is provided or obtained without the use of a clutch or brake to hold the in the stationary position. The multi-stable actuator includes a pair of superelastic-shape memory alloy (SE-SMA) wires that increase and decrease in length such that a moveable member moves between and is stationary at a plurality of predefined positions without the use of a brake or clutch. As used herein, the term "superelastic-shape memory alloy" refers to a shape memory alloy that exhibits up to 8 or 10% recoverable elastic strain. A first SE-SMA wire and a second SE-SMAS wire of the multi-stable actuator are arranged in tension with each other and a moveable element is attached to and between the first and second SE-SMA wires. When one of the SE-SMA wires is selectively heated, the heated SE-SMA wire decreases in length, the other SE-SMA wire increases in length, and the moveable element moves to a desired position. Also, by selectively heating the first and/or second SE-SMA wire(s) to different temperatures, the movable element is moved to three or more fixed and predefined actuator positions.

Figure 1:
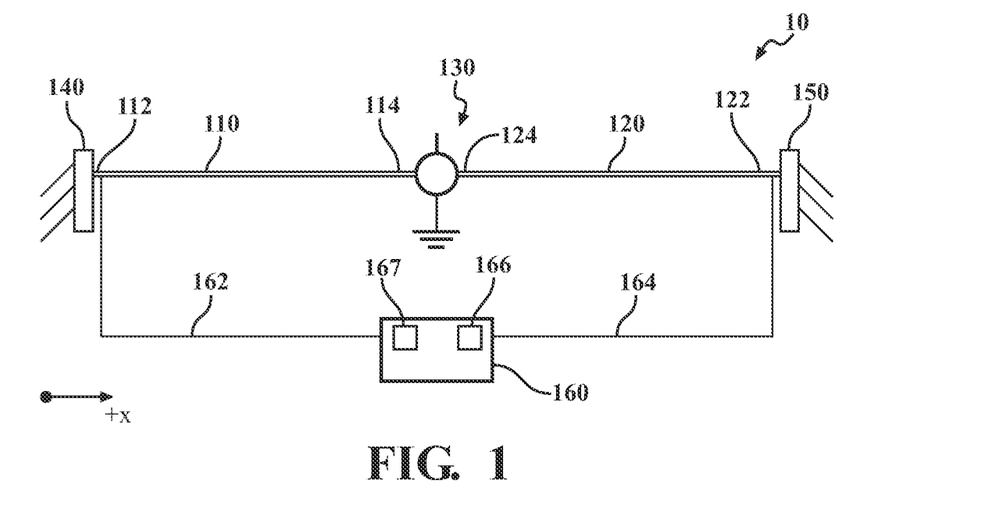
FIG. 1 shows a multi-stable actuator according to one form of the present disclosure.

Referring to FIG. 1, a multi-stable actuator 10 according to one form of the present disclosure is shown. The multi-stable actuator 10 includes a first SE-SMA wire 110 extending between a first fixed support 140 and a movable element 130, and a second SE-SMA wire 120 extending between a second fixed support 150 and the movable element 130. In some variations, a first end 112 of the first SE-SMA wire 110 is rigidly attached (referred to herein simply as "attached") to the first fixed support 140 and a second end 114 is attached to the movable element 130. Similarly, in some variations a first end 122 of the second SE-SMA wire 120 is attached to the second fixed support 150 and a second end 124 is attached to the movable element 130. Also, the first SE-SMA wire 110 is in tension with the second SE-SMA wire 120 and the second SE-SMA wire 120 is in tension with the first SE-SMA wire 110. Stated differently, the first and second SE-SMA wires 110, 120 are arranged in an antagonistic configuration with respect to each other.

The multi-stable actuator 10 includes at least one heating device 160 configured to selectively heat the first SE-SMA wire 110 and the second SE-SMA wire 120. In some variations, the at least one heating device 160 is an electric power supply 160 with a first electrical lead 162 in electrical communication with the first SE-SMA wire 110 and a second electrical lead 164 in electrical communication with the second SE-SMA wire 120. In at least one variation, the first and second electrical leads 162, 164 are in electrical communication with the first and second SE-SMA wires 110, 120, respectively, via a physical connection or attachment directly to the first and second SE-SMA wires 110, 120, respectively. In other variations, the first and second electrical leads 162, 164 are in electrical communication with the first and second SE-SMA wires 110, 120, respectively, via a physical connection or attachment to the first and second fixed supports 140, 150, respectively, which are in turn in electrical connection with the first and second SE-SMA wires 110, 120, respectively. And in some variations, the at least one heating device 160 is in wireless communication (e.g., microwave communication) with the first and second SE-SMA wires 110, 120.

In variations where the at least one heating device 160 is the electric power supply 160, the electrical power supply 160 is configured to selectively provide electric current to the first and second SE-SMA wires 110, 120 and thereby selectively resistance (Joule) heat the first and second SE-SMA wires 110, 120. For example, in some variations the movable element 130 is an electrical ground that electrically isolates the second end 114 of the first SE-SMA wire 110 from the second end 124 of the second SE-SMA wire 120 and thereby electrically isolates the first SE-SMA wire 110 from the second SE-SMA wire 120. Accordingly, electric current flowing from the electric power supply 160 into the first SE-SMA wire 110 heats the first SE-SMA wire 110 via resistance heating and electric current flowing from the electric power supply 160 into the second SE-SMA wire 120 heats the second SE-SMA wire 120 via resistance heating.

In some variations the multi-stable actuator 10 includes a controller 166 configured to command the at least one heating device 160 to selectively heat the first and second SE-SMA wires 110, 120. For example, the controller 166 can include and/or have access to memory 167 and the memory 167 can include a lookup table with electric current values and time values corresponding to heating the first and second SE-SMA wires to a desired temperature for a desired period of time such that the movable element 130 moves to and is stationary at a predefined position as discussed in greater detail below. In the alternative, or in addition to, the controller 166 includes and is configured to execute one or more algorithms (e.g., stored in the memory 167) that calculate an electric current value and a time value corresponding to heating the first and second SE-SMA wires to a desired temperature for a desired period of time such that the movable element 130 moves to and is stationary at a predefined position as discussed in greater detail below.

Figure 2:
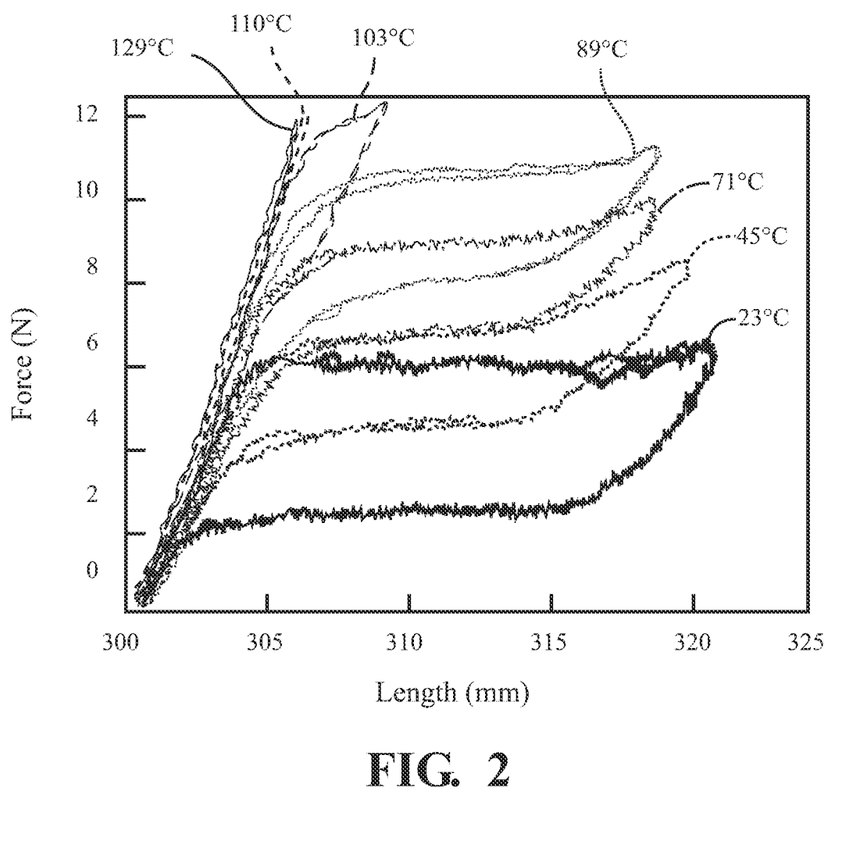
FIG. 2 shows a series of force versus length plots for a superelastic-shape memory alloy (SE-SMA) wire having an original length of 300 millimeters (mm) and tested at temperatures equal to 23° C., 45° C., 71° C., 89° C., 103° C., 110° C. and 129° C.

Non-limiting examples of the first and second SE-SMA wires 110, 120 include wires formed from nickel-titanium (Ni—Ti) SE-SMAs, copper-aluminum-nickel (Cu—Al—Ni) SE-SMAs, iron-manganese (Fe—Mn) SE-SMAs, and copper-zinc-aluminum (Cu—Zn—Al) SE-SMAs, among others. For example, and with reference to FIG. 2, plots of force versus length at different temperatures for one of the Ni—Ti SE-SMAs from which the first and second SE-SMA wires 110, 120 are formed are shown. Particularly, a plot of strength versus strain for the Ni—Ti SE-SMA wires 110, 120 at 23° C., 45° C., 71° C., 89° C., 103° C., 110° C., and 129° C. are shown.

Not being bound by theory, an SE-SMA wire typically has a high temperature phase referred to as "austenite" and a low temperature phase referred to "martensite". And upon cooling an SE-SMA wire from the austenite phase region to the martensite phase region, the SE-SMA wire transforms from austenite into a heavily twinned martensite via a shear type transformation. Also, the SE-SMA wire is easily deformed by realignment of the twinned martensite structure (sometimes referred to as "flipping over" shear) until a single orientation of the martensite is achieved. For example, elongation of an SE-SMA wire with an original length of 300 mm subjected to an increasing tensile force when the SE-SMA wire is at 23° C. is represented by the solid arrows in FIG. 2. And as shown by the solid arrows in FIG. 2, the SE-SMA wire initially exhibits a linear increase in length with increase force, but then reaches a generally horizontal portion when the tensile reaches about 6 Newtons (N). Accordingly, in this generally horizontal portion of the 23° C. curve, the SE-SMA wire will continue to elongate with a steady or constant 6 N force applied thereto until reaching a length of about 318 mm. However, when the elongated SE-SMA wire at 23° C. is heated to a high temperature, e.g., to 110° C., the SE-SMA wire transforms from martensite to austenite and thus exhibits or has force versus elongation behavior represented by the plot labeled 110° C. in FIG. 2. That is, the SE-SMA wire reverts or attempts to revert a length of about 302 mm as depicted by the dotted line arrow in FIG. 2. This behavior of the SE-SMA wires 110, 120, i.e., the elongation and shortening as a function of temperature for the SE-SMA wires 110, 120 arranged in tension with each other provides for a plurality of fixed positions for the movable element 130 with one non-limiting example described below.

Figure 3A:
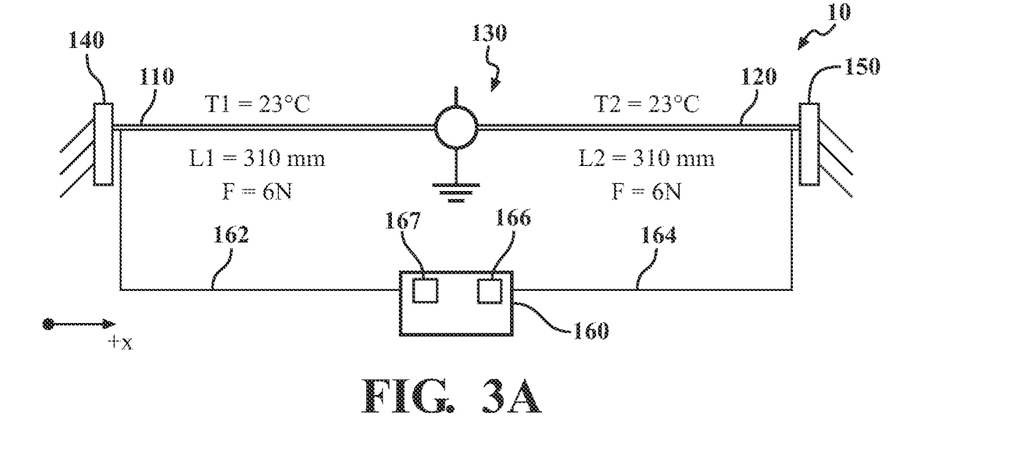
FIG. 3A shows the multi-stable actuator in FIG. 1 in a first state with a first SE-SMA wire and a second SE-SMA wire at a first temperature and a movable element in a first fixed position according to the teachings of the present disclosure.

Referring now to FIGS. 3A-3E, one non-limiting example of the multi-stable actuator 10 moving the movable element 130 from a first fixed position to a second fixed position is shown. The first and second SE-SMA wires 110, 120 each have an initial length equal to 300 mm before being assembled, and have a length of 310 mm after being assembled at 23° C. as shown in FIG. 3A with a length of 310 mm. Particularly, the first and second SE-SMA wires 110, 120 are held or maintained at a first temperature (i.e., 23° C.) while being assembled and elongated to 310 mm. The tensile force and length of the first and second SE-SMA wires 110, 120 are plotted or overlaid onto the force versus length plot shown in FIG. 4A where the symbols labeled '1' and '2' represent the first and second SE-SMA wires 110, 120, respectively. The tensile forces were measured by a first load cell (not shown) between the first fixed support 140 and the first end 112 and a second load cell (not shown) between the second fixed support 150 and the first end 122 of the second SE-SMA wire 120, and the lengths of the first and second SE-SMA wires 110, 120 were measured with a ruler. As shown in FIG. 4A, increasing the lengths of the first and second SE-SMA wires 110, 120 from 300 mm to 310 mm during assembly resulted in an increase in force on each of the SE-SMA wires 110, 120 from 0 N to about 6 N. This configuration or state of the multi-stable actuator 10 shown in FIG. 3A is referred to herein as a "first state."

Figure 3B:
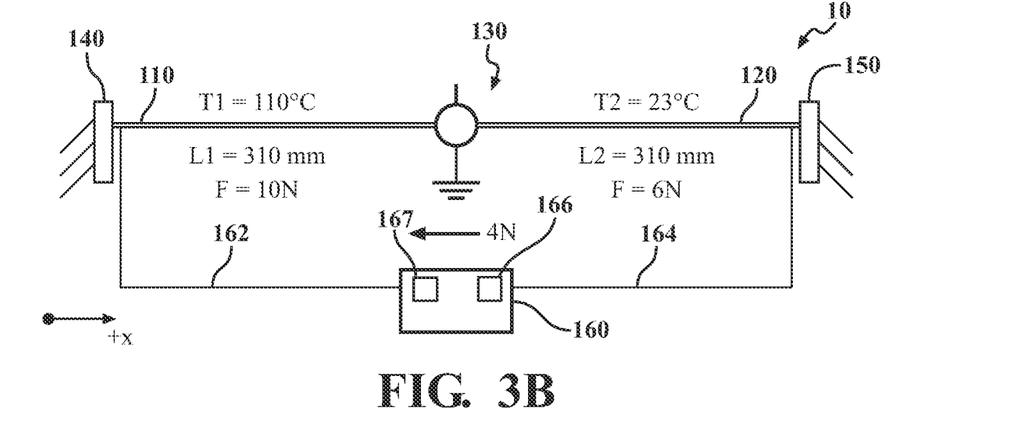
FIG. 3B shows the multi-stable actuator in FIG. 3A with the first SE-SMA wire selectively heated to a second temperature before the first SE-SMA wire decreases in length according to the teachings of the present disclosure.

Referring to FIGS. 3B-3D and 4B, movement of the movable element 130 as a result of the controller 166 commanding the at least one heating device 160 to selectively heating the first SE-SMA wire 110 to a second temperature equal to 110° C. while the second SE-SMA wire 120 remains at the first temperature equal to 23° C. is shown. Initially, heating the first SE-SMA wire 110 to 110° C. transforms the crystal structure of the first SE-SMA wire 110 from martensite to austenite, which in turns results in an increase in tensile force from 6 N to 10 N on the first SE-SMA wire 110 as represented in FIG. 3B and the arrow labeled '3B' in FIG. 4B. Stated differently, the first load cell between the first fixed support 140 and the first end 112 measured an increase in the tensile force before the first SE-SMA wire 110 started to elongate as discussed below with reference to FIGS. 3C and 3D.

Figure 3C:
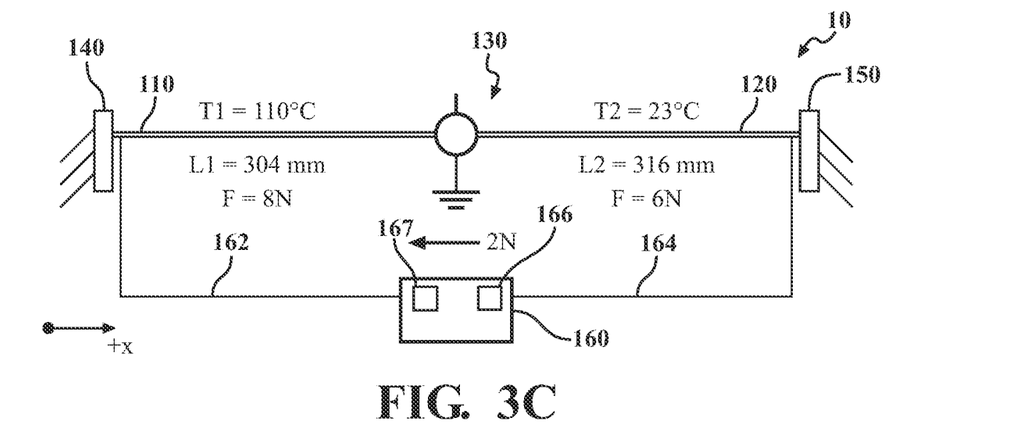
FIG. 3C shows the multi-stable actuator in FIG. 3B with the first SE-SMA wire selectively heated to the second temperature after the first SE-SMA wire decreases in length according to the teachings of the present disclosure.

The increased tensile force (i.e., 10 N) on the first SE-SMA 110 at 110° C. is transferred to the second SE-SMA wire 120 at 23° C. (i.e., the first SE-SMA wire 110 "pulls" on the second SE-SMA wire 120) such that the second SE-SMA wire 120 elongates to 316 mm as shown in FIG. 3C and eventually to 318 mm as shown in FIG. 3D as the first SE-SMA wire 110 decreases in length to 304 mm as shown in FIG. 3C and 302 mm as shown in FIG. 3D, and as represented by the arrows labeled '3C' and '3D' in FIG. 4B.

Figure 3D:
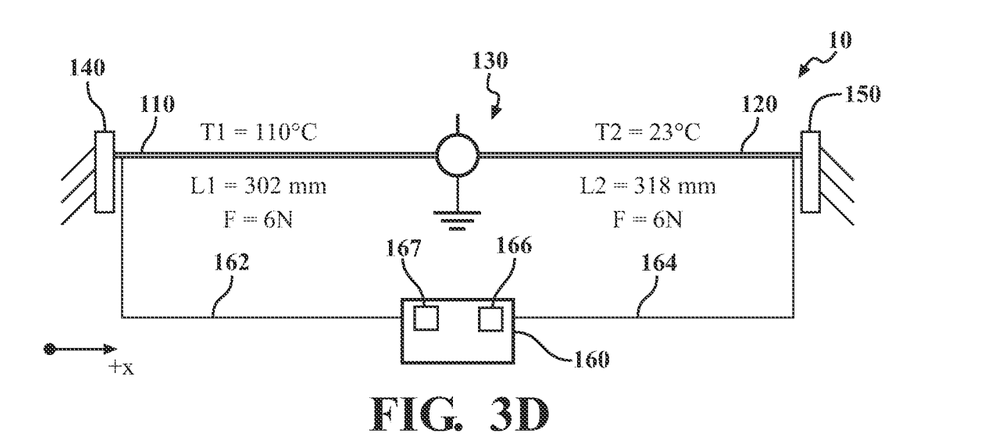
FIG. 3D shows the multi-stable actuator in FIG. 3C with the first SE-SMA wire selectively heated to the second temperature after the first SE-SMA wire decreases in length compared to FIG. 3C according to the teachings of the present disclosure.
Figure 3E:
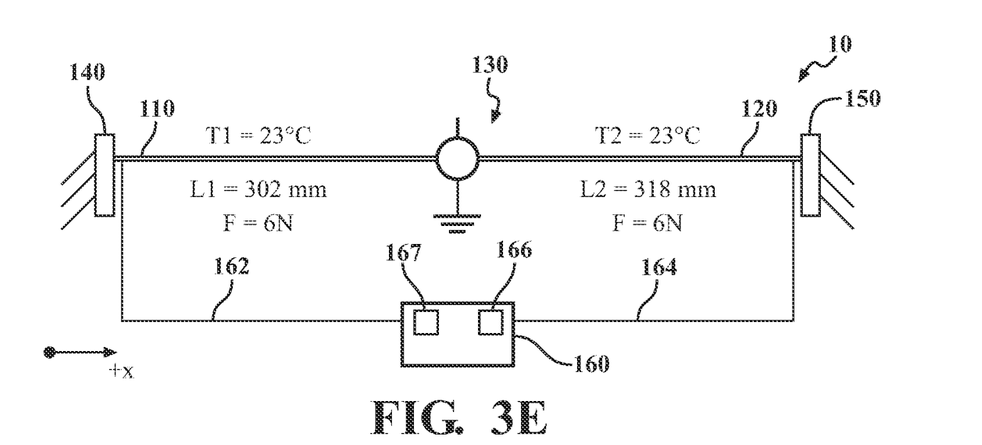
FIG. 3E shows the multi-stable actuator in FIG. 1 in a second state after the first SE-SMA wire of the multi-stable actuator in FIG. 3D is cooled to the first temperature and with the movable element in a second fixed position according to the teachings of the present disclosure.
Figure 4A:
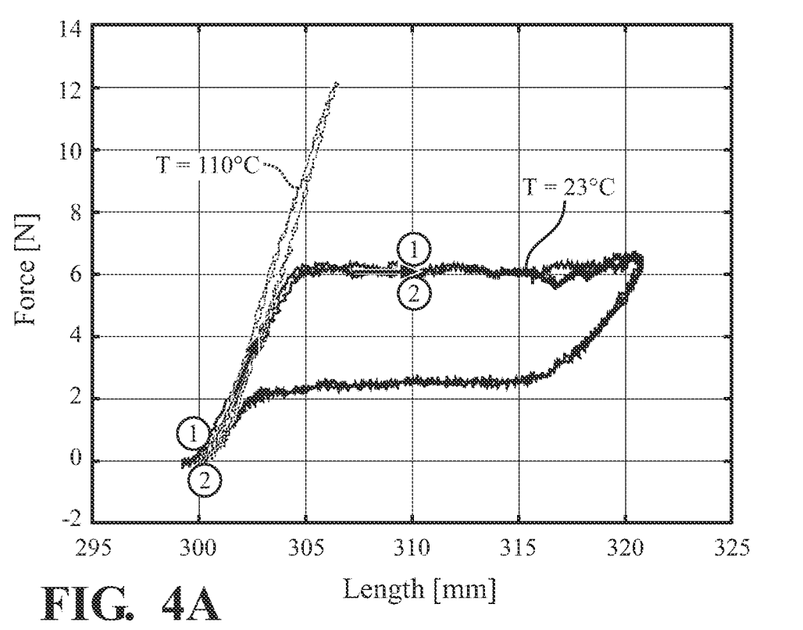
FIG. 4A shows a plot of force versus length for the SE-SMA wires of the multi-stable actuator in FIG. 3A where the symbol labeled '1' represents the force and length of the first SE-SMA wire and the symbol labeled '2' represents the force and length of the second SE-SMA wire.
Figure 4B:
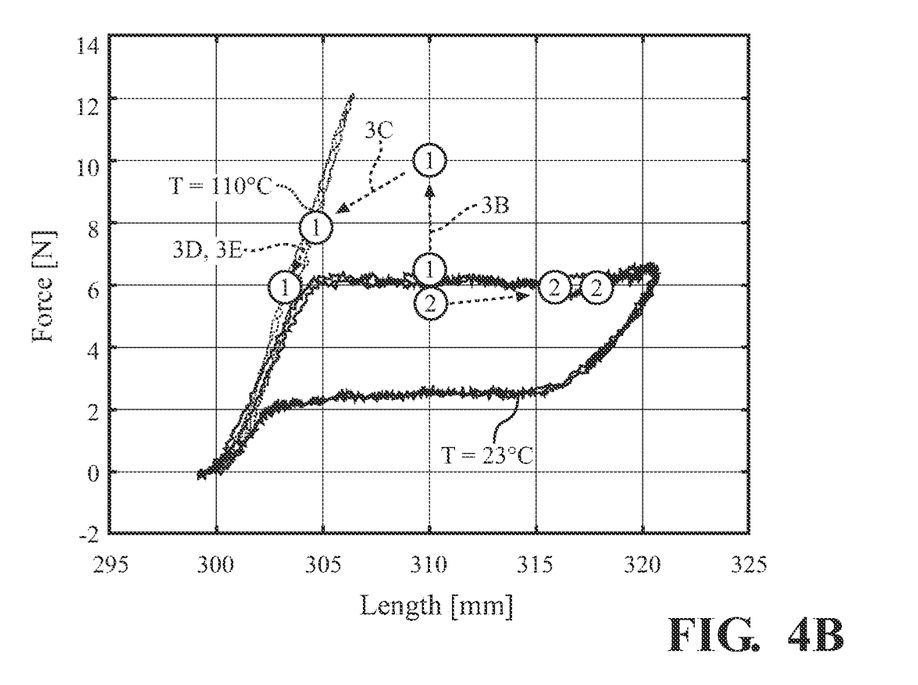
FIG. 4B shows a plot of the force and length for the SE-SMA wires of the multi-stable actuator in FIGS. 3B-3E.

After the first and second SE-SMA wires 110, 120 have reached an equilibrium tensile force, i.e., the first and second SE-SMA wires 110, 120 each apply an equal tensile force on each other as shown in FIG. 3D, the first and second SE-SMA wires 110, 120 each have a fixed length and the movable element 130 has a fixed position without the use of a brake or clutch. In addition, the first SE-SMA wire 110 can be cooled to the first temperature as shown in FIG. 3E (e.g., the controller 160 commands the at least one heating device 160 to stop selectively heating the first SE-SMA wire 110). This configuration or state of the multi-stable actuator 10 shown in FIG. 3E is referred to herein as a "second state" and in this manner, i.e., selectively heating the first SE-SMA wire to 110° C. until both SE-SMA wires 110, 120 have the same tensile force and then cooling the first SE-SMA wire 110 back down to 23° C., the multi-stable actuator 10 moves form the first fixed position shown in FIG. 3A to the second fixed position shown in FIG. 3E.

And while FIGS. 3A-3E show the movable element 130 move from the first fixed position to the second fixed position 8 mm to the left (−x direction), it should be understood that selective heating of the first SE-SMA wire 110 and the second SE-SMA wire 120 moves the movable element 130 to additional fixed positions. For example, heating the first SE-SMA wire 110 to 45° C. instead of 110° C. results in a temporary increase in force of about 7 N on the first SE-SMA wire 110 (FIG. 2), a final length of the first SE-SMA wire 110 (FIG. 2) of about 304 mm, a final length of the second SE-SMA wire of about 316 mm, and movement of the movable element 130 to a fixed position 6 mm in the −x direction. Also, and assuming the first and second SE-SMA wires 110, 120 are both at the first temperature (i.e., a low temperature) the second SE-SMA wire 120 can be heated to the second temperature (i.e., a high temperature) in order to move the movable element in the +x direction. Accordingly, it should be understood that the controller 166 is configured to command the at least one heating device 160 such that the first SE-SMA wire 110 is heated to one of a first temperature, a second temperature different than the first temperature, and a third (or fourth, fifth, among others) temperature different than the first and second temperatures, such that the first SE-SMA 110 wire decreases in length by a first distance, a second distance different than the first distance, and a third (or fourth, fifth, among others) distance different than the first and second distances, respectively, and the movable element 130 moves to a first fixed position, to a second fixed position different than the first fixed position, and a third (or fourth, fifth, among others) fixed position different than the first and second fixed positions, respectively.

Figure 5:
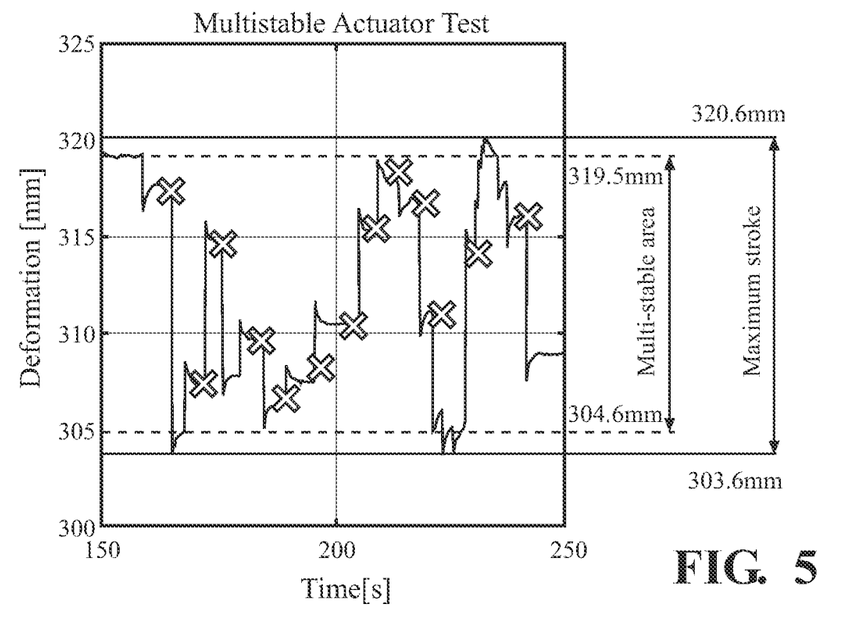
FIG. 5 shows a plot of a plurality of fixed positions for a movable member of the multi-stable actuator in FIG. 1.

Referring to FIG. 5, results for selectively heating the first SE-SMA wire 110 and the second SE-SMA wire 120 such that the movable element 130 is moved to and between more than ten (10) fixed positions are shown. Particularly, FIG. 5 shows a plot of the fixed position of the movable element 130 (symbol 'x') as a function of time during selective heating of the first SE-SMA wire 110 and the second SE-SMA wire 120 as discussed above. And as shown in FIG. 5, the movable element 130 is consistently and repeatably moved between a plurality of positions (+x and −x directions in FIGS. 3A-3E). And while the movable element 130 was consistently and repeatably moved via resistance heating of the first SE-SMA wire 110 and the second SE-SMA wire 120, it should be understood that other methods and techniques for selectively heating the first SE-SMA wire 110 and the second SE-SMA wire 120 are included within the teachings of the present disclosure, for example, selectively heating the first SE-SMA wire 110 and the second SE-SMA wire 120 using an air heat gun, a flame, microwave radiation, an induction heating unit(s), among others.

Figure 6:
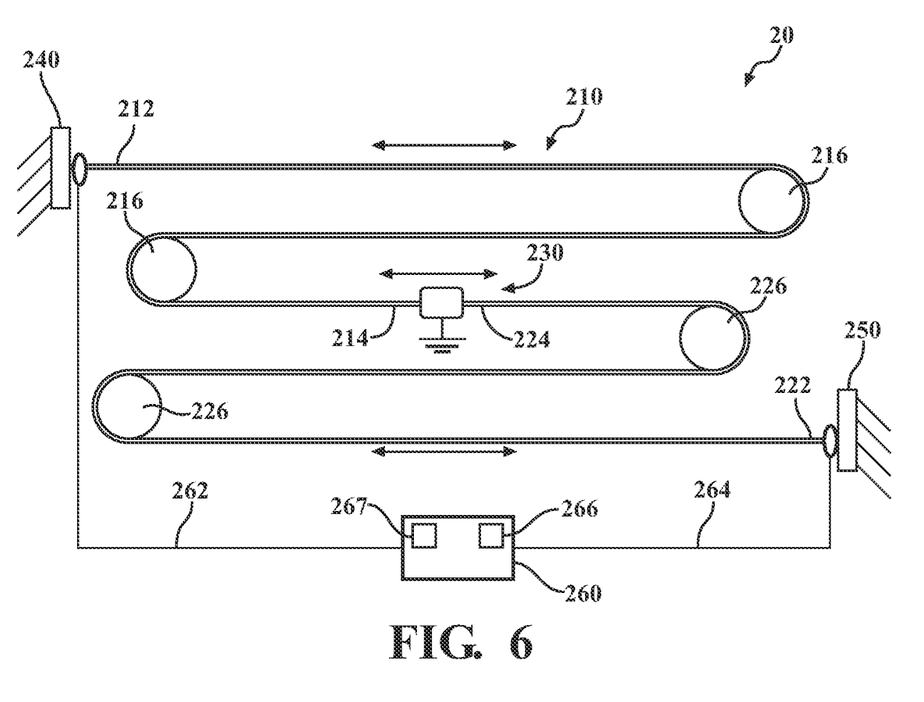
FIG. 6 shows a multi-stable actuator according to another form of the present disclosure.

Referring now to FIG. 6, a multi-stable actuator 20 according to another form of the present disclosure is shown. The multi-stable actuator 20 includes a first SE-SMA wire 210 extending between a first fixed support 240 and a movable element 230, and a second SE-SMA wire 220 extending between a second fixed support 250 and the movable element 230. In some variations, a first end 212 of the first SE-SMA wire 210 is attached to the first fixed support 240 and a second end 214 is attached to the movable element 230. Similarly, a first end 222 of the second SE-SMA wire 220 is attached to the second fixed support 250 and a second end 224 is attached to the movable element 230. Also, the first SE-SMA wire 210 is in tension with the second SE-SMA wire 220 and the second SE-SMA wire 220 is in tension with the first SE-SMA wire 210. Stated differently, the first and second SE-SMA wires 210, 220 are arranged in an antagonistic configuration with respect to each other. However, and unlike the multi-stable actuator 10 shown in FIG. 2, the multi-stable actuator 20 includes a first pair of pulleys 216 on which the first SE-SMA wire 210 is disposed, and a second pair of pulleys 226 on which the first SE-SMA wire 210 is disposed, such that a length (x direction) of the multi-stable actuator 20 is reduced compared to a multi-stable actuator without the pulleys.

The multi-stable actuator 20 includes at least one heating device 260 configured to selectively heat the first SE-SMA wire 210 and the second SE-SMA wire 220. In some variations, the at least one heating device 260 is an electrical power supply 260 with a first electrical lead 262 in electrical communication with the first SE-SMA wire 210 and a second electrical lead 264 in electrical communication with the second SE-SMA wire 220 as described above with respect to the first and second electrical leads 162, 164.

It should be understood that the electrical power supply 260 is configured to provide electrical current to the first and second SE-SMA wires 210, 220 and thereby selectively resistance heat the first and second SE-SMA wires 210, 220 as described above with respect to FIGS. 3A-3E. In some variations the multi-stable actuator 20 includes a controller 266 and memory 277 configured to command the electrical power supply 260 to selectively provide electrical current to the first SE-SMA wire 210 and the second SE-SMA wire 220 as described above with respect to controller 166 and memory 267.

Figure 7:
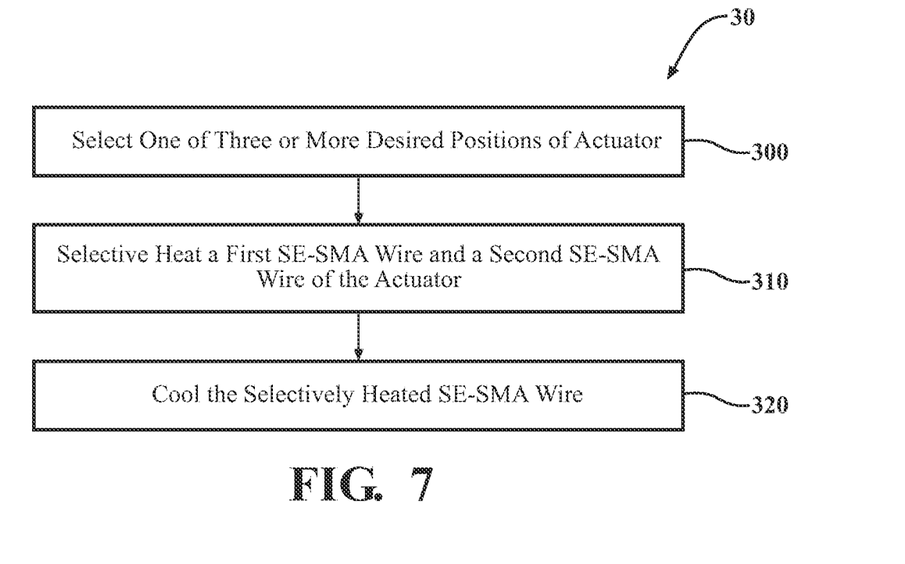
FIG. 7 is a flow chart for a method of operating a multi-stable actuator according to the teachings of the present disclosure.

Referring now to FIG. 7, a method 30 for operating a multi-stable actuator (e.g., multi-stable actuator 10 or 20) according to the teachings of the present disclosure is shown. The method 30 includes selecting one of at least three desired fixed positions for the multi-stable actuator at 300 (i.e., a desired fixed position of a movable element of the multi-stable actuator). A first SE-SMA wire and a second SE-SMA wire of the multi-stable actuator are selectively heated at 310 and then cooled at 320 as described above with respect to FIGS. 3A-3E such that the movable element of the multi-stable actuator moves to the desired fixed position. It should be understood that the movable element moves to desired fixed position without the use of a clutch or stop to hold the movable element.

Figure 8:
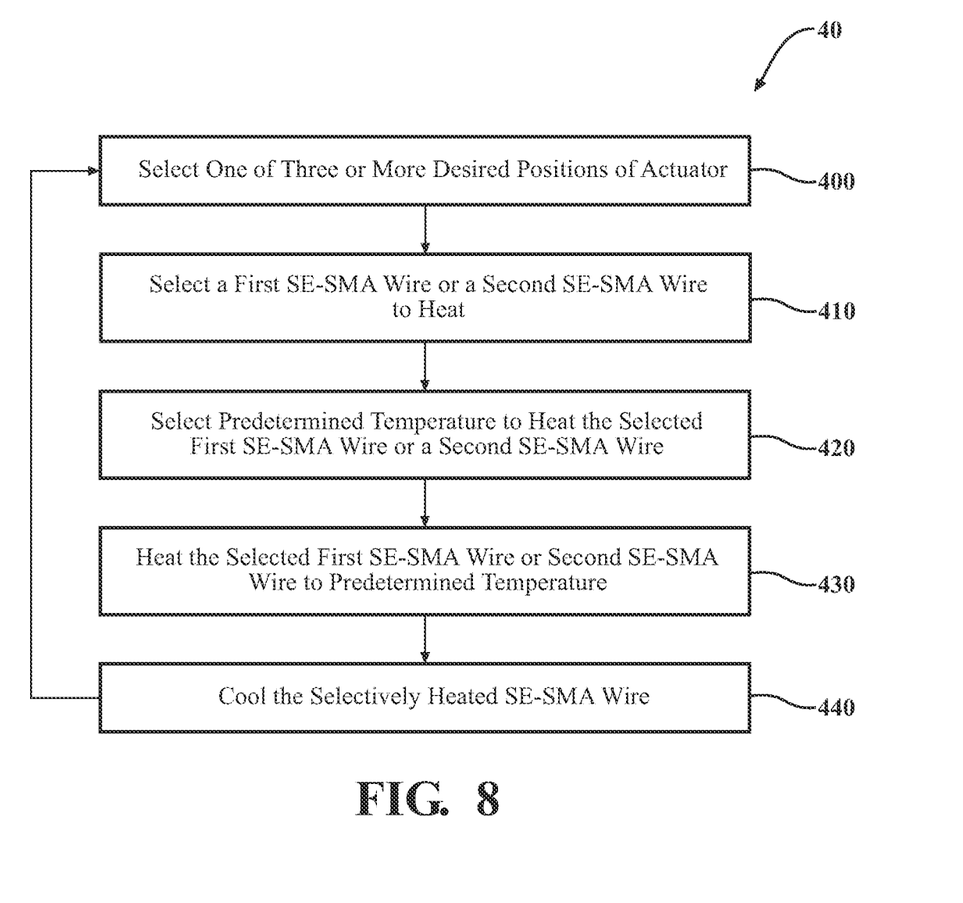
FIG. 8 is a flow chart for another method of operating a multi-stable actuator according to the teachings of the present disclosure.

Referring to FIG. 8, another method 40 for operating a multi-stable actuator according to the teachings of the present disclosure is shown. The method 40 includes selecting one or at least three fixed positions for the multi-stable actuator at 400. One or both of a first SE-SMA wire and a second SE-SMA wire of the multi-stable actuator is selected to be heated at 410 and a temperature or temperatures for the selected SE-SMA wire(s) to be heated, which is a function of the selected fixed position, is selected at 420. The selected SE-SMA wire(s) is/are heated to the selected temperature(s) at 430 and then cooled at 440 as described above with respect to FIGS. 3A-3E. In response, a movable element of the multi-stable actuator moves to the desired fixed position. The method 40 then returns to 400 and completes steps 400-440 such that the movable element is moved from the one desired fixed position to another fixed position. It should be understood that the method 40 continues this cycle such that a plurality of actuator fixed positions (e.g., 3, 4, 5, or more fixed positions) are selected and the movable element moves to each of the plurality of fixed positions during operation of a machine that uses or employs the multi-stable actuator.

The preceding description is merely illustrative in nature and is in no way intended to limit the disclosure, its application, or uses. Work of the presently named inventors, to the extent it may be described in the background section, as well as aspects of the description that may not otherwise qualify as prior art at the time of filing, are neither expressly nor impliedly admitted as prior art against the present technology.

As used herein, the phrase at least one of A, B, and C should be construed to mean a logical (A or B or C), using a non-exclusive logical "or." It should be understood that the various steps within a method may be executed in different order without altering the principles of the present disclosure. Disclosure of ranges includes disclosure of all ranges and subdivided ranges within the entire range.

The headings (such as "Background" and "Summary") and sub-headings used herein are intended only for general organization of topics within the present disclosure, and are not intended to limit the disclosure of the technology or any aspect thereof. The recitation of multiple variations or forms having stated features is not intended to exclude other variations or forms having additional features, or other variations or forms incorporating different combinations of the stated features.

As used herein the term "about" when related to numerical values herein refers to known commercial and/or experimental measurement variations or tolerances for the referenced quantity. In some variations, such known commercial and/or experimental measurement tolerances are +/−10% of the measured value, while in other variations such known commercial and/or experimental measurement tolerances are +/−5% of the measured value, while in still other variations such known commercial and/or experimental measurement tolerances are +/−2.5% of the measured value. And in at least one variation, such known commercial and/or experimental measurement tolerances are +/−1% of the measured value.

As used herein, the terms "comprise" and "include" and their variants are intended to be non-limiting, such that recitation of items in succession or a list is not to the exclusion of other like items that may also be useful in the devices and methods of this technology. Similarly, the terms "can" and "may" and their variants are intended to be non-limiting, such that recitation that a form or variation can or may comprise certain elements or features does not exclude other forms or variations of the present technology that do not contain those elements or features.

The broad teachings of the present disclosure can be implemented in a variety of forms. Therefore, while this disclosure includes particular examples, the true scope of the disclosure should not be so limited since other modifications will become apparent to the skilled practitioner upon a study of the specification and the following claims. Reference herein to one variation, or various variations means that a particular feature, structure, or characteristic described in connection with a form or variation or particular system is included in at least one variation or form. The appearances of the phrase "in one variation" (or variations thereof) are not necessarily referring to the same variation or form. It should be also understood that the various method steps discussed herein do not have to be carried out in the same order as depicted, and not each method step is required in each variation or form.

The foregoing description of the forms and variations has been provided for purposes of illustration and description. It is not intended to be exhaustive or to limit the disclosure. Individual elements or features of a particular form or variation are generally not limited to that particular form or variation, but, where applicable, are interchangeable and can be used in a selected form or variation, even if not specifically shown or described. The same may also be varied in many ways. Such variations should not be regarded as a departure from the disclosure, and all such modifications are intended to be included within the scope of the disclosure.

What is claimed is:

1. A multi-stable actuator comprising:
   a first superelastic-shape memory alloy (SE-SMA) wire extending between a first fixed support and a movable element, the movable element being an electrical ground;
   a second SE-SMA wire extending between a second fixed support and the movable element, wherein the first SE-SMA wire is in tension against the second SE-SMA wire and the second SE-SMA wire is in tension against the first SE-SMA wire; and
   at least one heating device, the at least one heating device being at least one electrical power supply configured to apply an electrical current and heat the first SE-SMA wire independent of the second SE-SMA wire and to apply an electrical current and heat the second SE-SMA wire independent of the first SE-SMA wire such that the movable element moves between and to at least three fixed positions without a brake.

2. The multi-stable actuator according to claim 1, wherein the first SE-SMA wire and the second SE-SMA wire are configured to decrease in length when heated by the at least one heating device.

3. The multi-stable actuator according to claim 1, wherein the first SE-SMA wire is configured to decrease in length and the second SE-SMA wire is configured to increase in length when the first SE-SMA wire is heated by the at least one heating device.

4. The multi-stable actuator according to claim 1, wherein the second SE-SMA wire is configured to decrease in length and the first SE-SMA wire is configured to increase in length when the second SE-SMA wire is heated by the at least one heating device.

5. The multi-stable actuator according to claim 1, wherein the first SE-SMA wire and the second SE-SMA wire are configured to decrease in length and increase in length, respectively, when the first SE-SMA wire is heated to a first temperature and the second SE-SMA wire is at a second temperature different than the first temperature such that the movable element moves from a first fixed position to a second fixed position.

6. The multi-stable actuator according to claim 5, wherein the first SE-SMA wire and the second SE-SMA wire are configured to decrease in length and increase in length, respectively, when the first SE-SMA wire is heated to a third temperature different than the first temperature and the second SE-SMA wire is at the second temperature such that the movable element moves from the first fixed position to a third fixed position different than the second fixed position.

7. The multi-stable actuator according to claim 6, wherein the first SE-SMA wire and the second SE-SMA wire are configured to decrease in length and increase in length, respectively, when the first SE-SMA wire is heated to a fourth temperature different than the third temperature and the second SE-SMA wire is at the second temperature such that the movable element moves from the first fixed position to a fourth fixed position different than the second and third fixed positions.

8. The multi-stable actuator according to claim 1, wherein the first SE-SMA wire and the second SE-SMA wire are configured to decrease in length and increase in length, respectively, when the first SE-SMA wire is heated to a first temperature and the second SE-SMA wire is heated to a second temperature less than the first temperature such that the movable element moves from a first fixed position to a second fixed position.

9. The multi-stable actuator according to claim 8, wherein the first SE-SMA wire and the second SE-SMA wire are configured to decrease in length and increase in length, respectively, when the first SE-SMA wire is heated to a third temperature different than the first temperature and the second SE-SMA wire is at the second temperature such that the movable element moves from the first fixed position to a third fixed position different than the second fixed position.

10. The multi-stable actuator according to claim 9, wherein the first SE-SMA wire and the second SE-SMA wire are configured to decrease in length and increase in length, respectively, when the first SE-SMA wire is heated to a fourth temperature different than the second and third temperatures and the second SE-SMA wire is at the second temperature such that the movable element moves from the first fixed position to a fourth fixed position different than the second fixed position.

11. The multi-stable actuator according to claim 10, wherein the first SE-SMA wire and the second SE-SMA wire are configured to increase in length and decrease in length, respectively, when the second SE-SMA wire is heated to a fifth temperature different than the second temperature and the first SE-SMA wire is at the second temperature such that the movable element moves from the fourth fixed position to a fifth fixed position different than the fourth fixed position.

12. The multi-stable actuator according to claim 1 further comprising a controller configured to command the at least one heating device such that the first SE-SMA wire is heated independent of the second SE-SMA wire and the second SE-SMA wire is heated independent of the first SE-SMA wire.

13. The multi-stable actuator according to claim 12, wherein the controller is configured to command the at least one heating device such that the first SE-SMA wire is heated to one of a first temperature, a second temperature different than the first temperature, and a third temperature different than the first and second temperatures, such that the first SE-SMA wire decreases in length by a first distance, a second distance different than the first distance, and a third distance different than the first and second distances, respectively, such that the movable element moves to a first fixed position, to a second fixed position different than the first fixed position, and a third fixed position different than the first and second fixed positions, respectively.

14. The multi-stable actuator according to claim 13, wherein the controller is further configured to command the at least one heating device such that the second SE-SMA wire is heated to a predefined elevated temperature such that the second SE-SMA wire decreases in length and the movable element moves to a fourth fixed position.

15. A multi-stable actuator comprising:
a first superelastic-shape memory alloy (SE-SMA) wire extending between a first fixed support and an electrical ground configured as a movable element;
a second SE-SMA wire extending between a second fixed support and the movable element, wherein the first SE-SMA wire is in tension against the second SE-SMA wire and the second SE-SMA wire is in tension against the first SE-SMA wire; and
an electrical power supply configured to:
apply electrical current to and heat the first SE-SMA wire independent of the second SE-SMA wire such that the first SE-SMA wire decreases in length a first predetermined amount and the second SE-SMA wire increases in length the first predetermined amount such that the movable element moves from a first predetermined fixed position to a second predetermined fixed position; and
apply electrical current to and heat the second SE-SMA wire independent of the first SE-SMA wire such that the second SE-SMA wire decreases in length a second predetermined amount and the first SE-SMA wire increases in length the second predetermined amount such that the movable element moves from the second predetermined fixed position to a third predetermined fixed position different than the first and second predetermined fixed positions.

16. The multi-stable actuator according to claim 15 further comprising a first pulley positioned between the first fixed support and the movable element, wherein the first SE-SMA wire is disposed on the first pulley.

17. The multi-stable actuator according to claim 16 further comprising a second pulley positioned between the second fixed support and the movable element, wherein the second SE-SMA wire is disposed on the second pulley.

18. A method of operating an actuator, the method comprising:
a) selectively heating a first superelastic-shape memory alloy (SE-SMA) wire of a multi-stable actuator such that the first SE-SMA wire decreases in length and a second SE-SMA wire of the multi-stable actuator increases in length, the multi-stable actuator comprising:
the first SE-SMA wire extending between a first fixed support and a movable element;
the second SE-SMA wire extending between a second fixed support and the movable element, wherein the first SE-SMA wire is in tension against the second SE-SMA wire and the second SE-SMA wire is in tension against the first SE-SMA wire; and
a heating device configured to heat the first SE-SMA wire independent of the second SE-SMA wire and to heat the second SE-SMA wire independent of the first SE-SMA wire, wherein:
the first SE-SMA wire and the second SE-SMA wire are configured to decrease in length and increase in length, respectively, when the first SE-SMA wire is heated to a first temperature and the second SE-SMA wire is heated to a second temperature less than the first temperature such that the movable element moves from a first fixed position to a second fixed position; and
the first SE-SMA wire and the second SE-SMA wire are configured to decrease in length and increase in length, respectively, when the first SE-SMA wire is heated to a third temperature different than the first temperature and the second SE-SMA wire is at the second temperature such that the movable element moves from the first fixed position to a third fixed position different than the second fixed position;
b) selectively heating the second SE-SMA wire such that the second SE-SMA wire decreases in length and the first SE-SMA wire increases in length; and
c) repeating a) and b) such that the movable element moves between and is stationary at more than two fixed positions without using a brake.

19. The method according to claim 18, wherein the movable element is an electrical ground, and the heating device is an electrical power supply configured to apply electrical current to and heat the first SE-SMA wire independent of the second SE-SMA wire and to apply electrical current to and heat the second SE-SMA wire independent of the first SE-SMA wire.

20. The multi-stable actuator according to claim 15 further comprising a controller configured to command the electrical power supply such that the first SE-SMA wire is heated independent of the second SE-SMA wire and the second SE-SMA wire is heated independent of the first SE-SMA wire.

* * * * *